Dec. 8, 1959     J. R. LIKENS, JR     2,916,135
CONVEYOR BUCKET
Filed Nov. 5, 1956
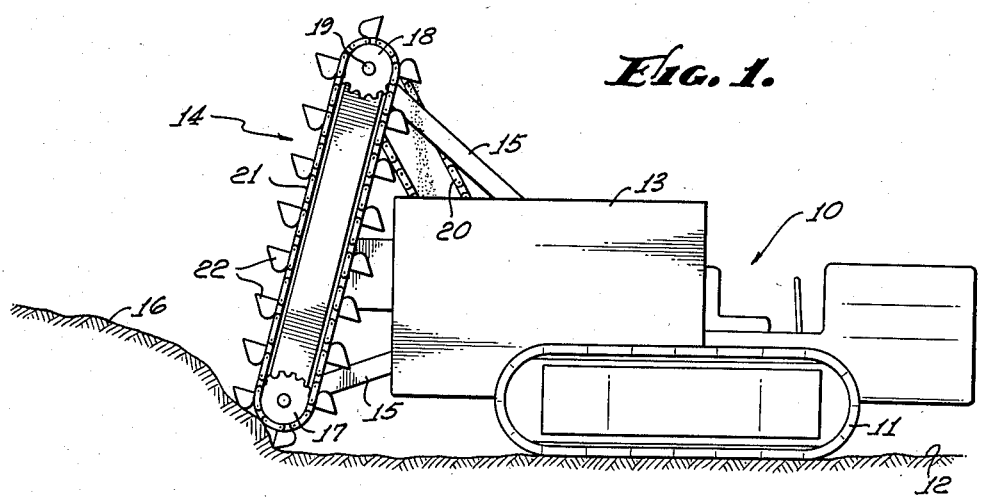
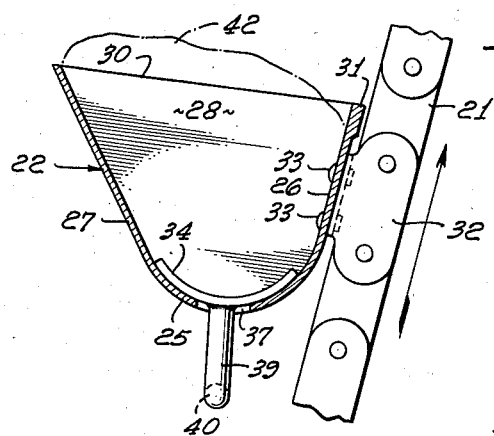
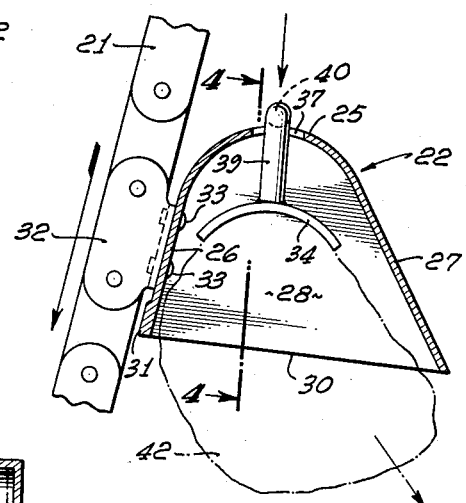
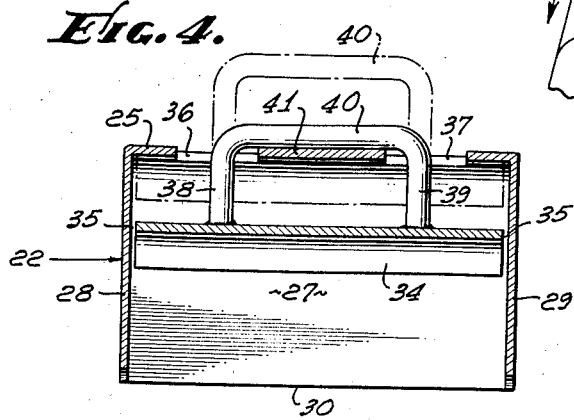
JAMES R. LIKENS, JR.
INVENTOR.
BY    HUEBNER, BEEHLER,
WORREL & HERZIG
ATTORNEYS United States Patent Office 2,916,135
Patented Dec. 8, 1959

2,916,135

CONVEYOR BUCKET

James R. Likens, Jr., Inglewood, Calif., assignor to Likens Manufacturing Co., Huntington Park, Calif., a corporation of California Application November 5, 1956, Serial No. 620,449

4 Claims. (Cl. 198—144)

The invention relates to conveyors of the endless belt type and has particular reference to a bucket adapted for attachment to such conveyor belt which is capable of digging into material to be moved and perhaps elevated a substantial distance and which is further capable of dumping the material thus moved when the bucket passes to another location during its travel with the belt.

Bucket conveyors of the type herein made reference to have been in use for a great many years. Buckets in the past have taken various forms and these forms on most occasions comprehend walls diverging outwardly from the bottom so that material, and particularly sticky material, when picked up is encouraged to fall free of the bucket when the bucket is turned upside down. As a rule the type of buckets referred to are employed on upright obliquely mounted conveyor belt assemblies, by use of which material is picked up by buckets as they make the turn near the bottom of the conveyor belt assembly, the buckets thereafter traveling an upwardly inclined route to the top and there turning over to an inverted position, in which position the contents are dumped either into a receptacle or perhaps upon a second usually horizontally operating conveyor belt.

Although buckets of conventional design have been successfully employed with a great variety of materials, considerable difficulty is frequently encountered in the handling of somewhat sticky materials such as wet earth containing a high percentage of clay. This material and other comparable materials is extremely sticky and becomes compacted within the bucket as the belt conveyor mechanism is forced into the material during the process of removal. Such compacted sticky material is inclined to remain in the bucket after the bucket has been inverted unless some external means is employed to jar it loose and even on such occasions only a portion of the contents of the bucket may be dumped. Buckets which continue to travel around to the material to be moved, half full of material, cause the belt conveyor system to operate inefficiently and considerably hamper effective use of such machinery.

It is therefore among the objects of the invention to provide a new and improved bucket for a belt conveyor system which is capable of automatically dislodging the contents of the bucket when turned upside down and which thereafter is capable of assuming an initial position wherein the bucket is adapted to be loaded to capacity in its next pass through the material to be moved.

Another object of the invention is to provide a new and improved self-clearing bucket for a bucket conveyor system which employs a false bottom of relatively heavy weight secured in position by a retainer passing outside of the bucket bottom, the retainer likewise being rugged and heavy, thereby to add to the effective weight of the false bottom or liner in order to add to the ability of the device to dislodge sticky and tenacious contents which may become packed in position as the bucket enters the material to be moved.

Still another object of the invention is to provide a new and improved self-clearing bucket for a bucket conveyor system which is of substantially conventional exterior size and shape, thereby being adapted to fit conventional equipment but which has incorporated therein an automatic dislodging liner at the bottom for assisting in the dislodgment of the bucket contents when inverted and which at the same time quickly and automatically reassumes an initial position as promptly as the bucket is turned right side up.

Also included among the objects of the invention is to provide a new and improved bucket type conveyor device wherein each and every one of a series of buckets on the device is capable of automatically clearing itself when the bucket is passed to an inverted location on the device and which is capable of reassuming a position of maximum bucket capacity when turned right side up, the device being one capable of employment in substantially standard pieces of equipment and at the same time being simple in operation, rugged in design, and relatively inexpensive both with respect to first cost and maintenance.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings.

Figure 1 is a side elevational view of a typical earth-moving machine on which an endless bucket type conveyor device is mounted.

Figure 2 is a longitudinal sectional view of one of the buckets on the conveyor device in upright position.

Figure 3 is a longitudinal sectional view of one of the buckets on the conveyor device in inverted position.

Figure 4 is a transverse longitudinal sectional view taken on the line 4—4 of Figure 3.

In an embodiment of the invention chosen for the purpose of illustration there is shown a typical piece of mechanized earth-moving machinery embodied in a tractor 10 having caterpillar treads 11 adapted to travel over the surface 12 of the ground. The caterpillar is shown as having mounted thereon a material receiving box 13. Extending endwardly of the tractor is a bucket-like conveyor device indicated generally by the reference character 14 supported by brackets 15 upon the tractor. In the particular type of earth-moving equipment here illustrated the conveyor device is an upright device tilted at the top in a direction slightly toward the box 10 in order that material from a heap 16 may be elevated and deposited into the box.

The conveyor device here shown comprises a lower sprocket 17 and an upper sprocket 18, the sprocket 18 being mounted upon a shaft 19 driven appropriately in a desired direction by an endless chain 20. A belt-type conveyor here chosen for the purpose of illustration is an endless chain 21 which extends over the sprockets 17 and 18. The travel of the endless chain 21, as is clear from the drawings, is such that buckets 22 located endwardly outward of the tractor move upwardly and the buckets adjacent the tractor move downwardly. The conveyor device is arranged in such fashion that the lowermost buckets are adapted to dig into the heap 16 wherein they are loaded and compacted with the material and then carry the material over the top of the sprocket 18 and dump the material in the box 13 as each bucket becomes inverted.

The buckets 22 identical in form and size comprise each a rounded or arcuate bottom 25, a short, flat, rear wall 26, and a somewhat longer flat front wall 27. It will be noted that the walls diverge outwardly from the bottom, the width of the front wall being such that it has a pronounced projection outwardly thereby to facilitate digging into the material which is to be handled.

A pair of parallel end walls 28 and 29 close the area around the bottom 25 and provide a bucket with an open top 30. Ordinarily the edges of the walls are secured by welding, there being initially provided a reinforcing strip 31 welded throughout the length of the outermost edge of the rear wall 26. The rear wall is employed to secure the bucket to an appropriate special link 32 of the chain belt by means of appropriate bolts or rivets 33.

Within each bucket is a liner or false bottom 34 which is transversely arcuate in shape so as to precisely fit and nest within the inside of the curved bottom 25. The liner as will be noted is somewhat shorter in length than the distance between the end walls 28 and 29 so as to provide an ample clearance 35 at each end, the clearance being great enough so that the liner will not bind against the side walls even though it might be tipped to a considerable degree. There must be ample freedom of movement of the liner at all times.

The bottom 25 in the chosen embodiment is shown provided with somewhat elongate apertures 36 and 37 which extend through the bottom. These apertures of course are closed when the bucket is in upright position by the liner located as shown at the bottom of the bucket.

To secure the liner within the confines of the bucket in all positions there is provided a retainer herein constituting legs 38 and 39 anchored to the liner at the inside ends and extending outwardly through the respective apertures 36 and 37. At the outer ends of the legs a bar 40 is employed, the bar being in a position overlying a section 41 of the bottom 25, that being a section intermediate the apertures 36 and 37.

In operation when the buckets are mounted, as illustrated in Figure 1, the buckets one by one dig into the heap 16 of material, thereby to acquire a load 42 in the bucket. As the bucket containing the load passes over the sprocket 18 the bucket is turned upside down to inverted position, namely, the position illustrated in Figure 3. In that position should the load be tacky or sticky and resist falling from the open top 30 of the bucket, emptying of the bucket is assisted by the combined weight of the liner 34 and the retainer comprising in the chosen embodiment the legs 38, 39 and bar 40. In inverted position the liner will tend to drop by gravity and carry with it the lower portion of the load 42. Since the liner occupies substantially the entire curved portion of the bottom 25, an ample area of contact is provided thereby to substantially clear the entire lower portion of the bucket by force of movement of the liner, even though the material of the load 42 might be tacky and sticky to a considerable degree.

After the load has been moved and the bucket 22 reaches the lower side of the sprocket 17, the liner will begin to return to the initial position illustrated in Figure 2. This may occur before the bucket is returned to a right-side up position under circumstances where material from the heap 16 is pushed into the bucket as the bucket is advanced in a more or less horizontal direction toward the material. Here again by reason of the fact that the liner has considerable area, it will be forced against the bottom 25 of the bucket before any appreciable portion of material might find its way around the sides of the liner and as a consequence there is little or no likelihood of any of the material becoming lodged between the bottom of the liner and the bottom of the bucket.

It will be noted that the structure of the bucket and in particular the liner and its retainer is extremely rugged and simple in that the retaining means embodied in the legs 38, 39 and bar 40 are such as to add considerable weight to the liner when in inverted position. This added weight is a material help in dislodging the load from the bucket. Should one side of the load be more sticky than the other, thereby tending to tilt or cock the liner, the ample clearance between the sides of the apertures 36, 37 and the legs 38, 39 permits wide tilting without binding within the amount of travel permitted by the length of the legs 38, 39. This length of travel, while considerably less than the over-all depth of the bucket, is nevertheless a considerably large portion of that depth, sufficient in any event to dislodge any and all types of material ordinarily encountered with operation of machinery of the kind herein described.

There has accordingly been described herein an automatic self-clearing and self-readjusting bucket device for endless conveyors which is suitable for use in practically all types of gravity actuated belt conveyors and which is simple in construction to the extent of minimizing servicing and replacement and at the same time providing a mechanical structure which may be readily and easily cleaned at the conclusion of an operation.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A self-clearing traveling container adapted for attachment to a conveyor belt comprising a bucket having a rounded bottom, a rear wall and a front wall diverging outwardly from the bottom, a pair of end walls and an open top, a rigid bottom liner having an arcuate shape complementary to the shape of the rounded bottom and normally resting on the bottom when the bucket is in upright position, said liner having a length less than the distance between the walls at opposite ends of the liner and a breadth less than the distance between the front and rear walls at all locations between the liner and the open top whereby to provide an ample clearance on all sides for all positions of the liner, said bottom having at least one clearance aperture extending therethrough and a retainer comprising a leg of cross sectional area less than the area of the respective aperture extending through the aperture into engagement with the liner and retaining means on the leg and overlying adjacent portions of the bottom whereby when the bucket is inverted the liner is free to tilt and the combined weight of said liner and retainer is adapted to dislodge the contents of the bucket and urge said contents outwardly.

2. A self-clearing traveling container adapted for attachment to a conveyor belt comprising a bucket having a rounded bottom, a flat rear wall and a flat front wall diverging outwardly from the bottom, substantially parallel end walls and an open top, said rear wall being adapted for attachment to the conveyor belt, a bottom liner having a laterally arcuate shape complementary to the shape of the rounded bottom and normally resting on the bottom when the bucket is in upright position, said liner having a length less than the distance between said end walls and a breadth less than the breadth of the bucket at all locations between said open top and the liner when at rest on the bottom whereby to provide an ample clearance at all unseated positions of the liner, said bottom having a pair of longitudinally spaced clearance apertures extending therethrough throughout a substantial area of said rounded bottom, a retainer comprising legs of cross sectional area less than the area of the apertures extending through the apertures into engagement with the liner, and retaining means on the outer ends of the legs and overlying the bottom, said liner, legs and retainer having a combined weight comparable to the weight of a capacity load for the bucket whereby when the bucket is inverted the liner falls freely throughout the limits of its movement until said retainer strikes the outside of said bottom and the said combined weight is adapted to dislodge the contents of the bucket and urge said contents outwardly a distance limited by the length of said legs.

3. A self-clearing traveling container adapted for attachment to a conveyor belt comprising a bucket having a rounded bottom, a flat relatively short rear wall and a flat relatively long front wall diverging outwardly from the bottom, substantially parallel end walls and an open top, said rear wall being adapted for attachment to the conveyor belt, a rigid continuous bottom liner having a laterally arcuate shape complementary to the shape of the rounded bottom and normally resting on the bottom when the bucket is in upright position, said liner having a length less than the distance between said end wall and a breadth less than the distance between said front and rear walls at all locations of the liner between the open top and the position at rest on the bottom whereby to provide an ample clearance on all sides, said bottom having a pair of longitudinally spaced elongated clearance apertures extending therethrough and a retainer comprising legs of cross sectional area less than half the area of the apertures extending through the apertures with a clearance in all directions, said legs having a rigid engagement with the liner and a bar joining outer ends of the legs and overlying that portion of the bottom between said apertures whereby when the bucket is inverted the liner is free to tilt in various directions and said tilting and the combined weight of said liner and retainer is adapted to dislodge the contents of the bucket and urge said contents outwardly a distance limited by the length of said legs.

4. An upright bucket type conveyor device comprising an endless belt and rotatable belt supports at upper and lower ends thereof, a series of buckets mounted on the belt adapted to travel erect on one side of the belt and inverted on the other side of the belt, each said bucket comprising a transversely rounded bottom, a rear wall attached to the belt, a front wall extending obliquely outwardly from the bottom and a pair of end walls, a rigid imperforate arcuate liner for the bottom and resting on the bottom in erect position of the bucket, said liner being smaller in length and breadth than the length and breadth of the bucket at all portions thereof said bottom having at least one aperture extending therethrough, a leg on the liner extending outwardly through the aperture beyond the outside wall of the bottom with a clearance in all directions and retaining means at the outer end of the leg adapted to limit travel of the liner away from the bottom when the bucket is in inverted position whereby the liner and the legs and said retainer are adapted to fall freely until the retainer strikes the outside of said bottom thereby to dislodge material picked up by the bucket, said liner being free to fall back to a position on the bottom when the bucket passes from an inverted position to an erect position.

References Cited in the file of this patent
UNITED STATES PATENTS

| | | |
|---|---|---|
| 482,252 | Jacobs | Sept. 6, 1892 |
| 885,049 | Holcomb | Apr. 21, 1908 |
| 1,429,093 | Paranteau | Sept. 12, 1922 |
| 2,652,791 | Listen | Sept. 22, 1953 |

FOREIGN PATENTS

| | | |
|---|---|---|
| 263,977 | Great Britain | Jan. 13, 1927 |